United States Patent
Rackham et al.

(10) Patent No.: US 7,408,171 B2
(45) Date of Patent: Aug. 5, 2008

(54) PROVIDING INFORMATION

(75) Inventors: Jamie Rackham, Cumbria (GB);
Thomas Dockray, Cumbria (GB)

(73) Assignee: Bil Solutions Limited, Seascale Cumbria (GB)

( * ) Notice: Subject to any disclaimer, the term of this patent is extended or adjusted under 35 U.S.C. 154(b) by 0 days.

(21) Appl. No.: 11/389,323

(22) Filed: Mar. 24, 2006

(65) Prior Publication Data

US 2006/0231768 A1 Oct. 19, 2006

(30) Foreign Application Priority Data

Mar. 24, 2005 (GB) .................... 0506079.3

(51) Int. Cl.
*G01T 1/00* (2006.01)
(52) U.S. Cl. .................... 250/395
(58) Field of Classification Search ............. 250/395
See application file for complete search history.

(56) References Cited

U.S. PATENT DOCUMENTS

| | | | |
|---|---|---|---|
| 4,353,863 A | 10/1982 | Leenders | |
| 4,617,169 A | 10/1986 | Brodzinski et al. | |
| 4,777,367 A | 10/1988 | Kawasaki et al. | |
| 6,228,664 B1 | 5/2001 | Bronson et al. | |

| 2002/0163988 A1 | 11/2002 | Nisius et al. |
|---|---|---|
| 2003/0205677 A1 | 11/2003 | Caldwell et al. |

FOREIGN PATENT DOCUMENTS

| EP | 1 548 464 A1 | 6/2005 |
|---|---|---|
| GB | 2 398 381 A | 8/2004 |
| WO | WO 01/07888 A | 2/2001 |
| WO | WO 2004/079392 A3 | 9/2004 |

OTHER PUBLICATIONS

F. Levai, *Development of Computed Tomographic Methods for Verification of Nuclear Materials In Storage or in Closed Containers*, Kernenergie, Akademie Verlag., Berlin, Germany, vol. 32 No. 2, Feb. 1, 1989, pp. 50-57.

(Continued)

*Primary Examiner*—Constantine Hannaher
(74) *Attorney, Agent, or Firm*—Workman Nydegger (57) ABSTRACT

A method for providing information on the dispersion of a radioactive material within a matrix includes measuring emissions of a first energy, the emissions including emissions of a first type, to provide a first type value; measuring emissions of a second energy, the emissions including emissions of a second type, to provide a second type value; measuring emissions of a third energy, the emissions including emissions of a third type, to provide a third type value; the interrelationship of the values for the first type value, second type value and third type value providing information on the dispersion of the radioactive material within the matrix due to the different effects of dispersion upon those different values.

20 Claims, 6 Drawing Sheets

OTHER PUBLICATIONS

J. Morel, et al., *A Non-Destructive Method Based on Gamma Spectrometry for the Measurements of Plutonium Hold-Up or Plutonium Wastes*, Conference Title 3. International Conference on Facility Operations Safeguards Interfaces, San Diego, California, Nov. 1987, Transactions of the American Nuclear Society, vol. 55.

Matthew R. Newell et al., *Performance of WIPP Certificate Mobile Waste Characterization NDA Measurements on TRU Waste Drums at LLNL*, Nuclear Material Management, 1998, vol. 27, No. 3, pp. 1801-1807.

IPAN/GEA Drum System, Imaging Passive-Active Neutron/Gamma Energy Assay Drum System Brochure for BNFL Instruments, Ltd., England, 1997.

IPAN/GEA Crate System, Imaging Passive-Active Neutron/Gamma Energy Assay Crate system, Brochure for BNFL Instruments, Ltd., England 1997.

J. Steven Hansen, *Tomographic Gamma Scanning of Uranium a New Lump Correction Technique*, 7th International Conference on Facility Operations—Safeguards Interface, LA-UR-04-1239, Feb. 29-Mar. 5, 2004, pp. 1-7.

PROVIDING INFORMATION

BACKGROUND OF INVENTION

1. Field of the Invention

This invention concerns improvements in and relating to providing information, particularly, but not exclusively, on the dispersion of radioactive material within a matrix.

2. Present State of the Art and Summary of the Invention

The establishment of the amount of radioactive material within a matrix is useful in a number of situations. Particularly in the context of uranium, the ability of the radioactive material to shield against its own emissions is a potential source of error. At present this is addressed by considering the measured result in a pessimistic manner. However, undue pessimism causes increased cost and exposure to dose considerations.

The present invention has amongst its potential aims to indicate whether self-shielding is an issue for radioactive material within a matrix.

According to a first aspect of the present invention we provide a method for providing information on the dispersion of a radioactive material within a matrix, the method comprising:

- measuring emissions of a first energy, the emissions including emissions of a first type, to provide a first type value;
- measuring emissions of a second energy, the emissions including emissions of a second type, to provide a second type value;
- measuring emissions of a third energy, the emissions including emissions of a third type, to provide a third type value;
- the interrelationship of the values for the first type value, second type value and third type value providing information on the dispersion of the radioactive material within the matrix.

The information on the dispersion may be an indication that the radioactive material is dispersed or an indication that the radioactive material is not dispersed. The information on the dispersion may be an indication that the radioactive material can be considered to be dispersed or not be considered to be dispersed. The information may provide a measure of the dispersion. The information may be used to confirm and/or question information on dispersion from another methodology, for instance differential peak analysis.

The radioactive material may be uranium and/or an isotope thereof. The uranium may be present along with one or more other elements or isotopes of other elements. The method may provide information on the dispersion of one or more other elements or isotopes of other elements, but need not.

The matrix may be waste. The matrix may be of lower density and/or lower atomic number than the radioactive material. The matrix may be present in a container, for instance a drum or crate.

The emissions may be measured by one or more detectors.

Preferably the first energy is 98.44 keV. The emissions of the first energy may be measured by measuring a range of energies. Preferably the range of energies includes 98.44 keV. The range of energies may have a lower limit of 96.9 keV±0.5 keV. The range of energies may have a lower limit of 96.9 keV±0.25 keV. The range of energies may have a lower limit of 96.9 keV±0.1 keV. The range of energies may have an upper limit of 100.4 keV−0.5 keV+5 keV. The range of energies may have an upper limit of 100.4 keV±0.5 keV. The range of energies may have an upper limit of 100.4 keV±0.25 keV. The range of energies may have an upper limit of 100.4 keV±0.1 keV.

The emissions of the first type may be uranium K X-ray emissions. The emissions of the first type may be emissions caused by movement of electrons between shells and/or orbits. The emissions of the first type may be uranium $K\alpha$ emissions, particularly uranium $K\alpha_1$ emissions. The emissions of the first type may be K X-ray emissions, particularly $K\alpha_1$ emissions, from a uranium atom caused by alpha and/or beta emissions from another uranium atom. The emissions of the first type may be K X-ray emissions, particularly $K\alpha_1$ emissions, from a uranium atom caused only by alpha and/or beta emissions from another uranium atom. The emissions of the first type may be emissions arising from self-stimulation of the uranium and ideally only by this mechanism.

Preferably the emissions of the first type are emitted by uranium.

The first type value may be expressed as a count rate or count or intensity or peak height or peak area.

The first type value may be corrected.

The first type value may be corrected for attenuation by the matrix. The first type value may be corrected for detector efficiency and/or attenuation, particularly relative to different detector efficiencies and/or attenuation at other energies.

The first type value may be corrected to remove emissions, for instance of other types and/or from other sources. The first type value may be corrected to remove emissions from other elements than uranium. The first type value may be corrected to remove emissions other than uranium K X-ray emissions and in particular other than $K\alpha_1$ emissions. The first type value may be corrected to remove emissions from plutonium and/or stimulated by emissions from plutonium. The first value may be corrected to remove plutonium K X-ray emissions and/or to remove K X-rays arising from the decay of plutonium and/or to remove uranium K X-rays caused by stimulation other than by uranium, for instance by plutonium. The first type value may be corrected to remove emissions from and/or stimulated by emissions from caesium and in particular from $Cs^{137}$. The first value may be corrected to remove uranium K X-rays caused by stimulation by caesium.

The first type value may be corrected to remove emissions other than those arising from the uranium and caused only by alpha and/or beta emissions from the uranium. The first type value may be corrected to remove emissions other than those arising from the uranium caused by alpha and/or beta emissions from another uranium atom. The first type value may be corrected to remove emissions other than those arising from self-stimulation of the uranium. The first type value may be corrected to remove K X-ray emissions, potentially $K\alpha$ emissions, ideally $K\alpha_1$ emissions, arising from stimulation of the uranium by alpha and/or beta and/or gamma emissions from other than uranium. The first type value may be corrected to remove K X-ray emissions, potentially $K\alpha$ emissions, ideally $K\alpha_1$ emissions, arising from stimulation of the uranium by alpha and/or beta and/or gamma emissions from plutonium and/or caesium.

The correction may be provided by establishing the amount in the matrix in respect of one or more other sources. The correction may involve the removal from the first type value of a correction proportional to the emissions within the first energy range which would arise from the established amount of that other source. The amount of the other source in the matrix may be established by measuring the emissions at at least one energy characteristic of that other source, and ideally at at least one energy characteristic of that other source only. The value for the other source emissions may be expressed as a count rate or count or intensity or peak height or peak area. The value of the correction may be obtained by the known ratio of the other source emissions at the characteristic energy to the emissions from that other source which would therefore arise or would be generated by that other sources action on other material, particularly uranium, at an energy or energies falling within the first energy range. Such a correction may be provided in respect of one or more other sources, and in particular in respect of plutonium and/or caesium.

The method may include measuring one or more energies characteristic of other sources. Where the measurement indicates the presence of one or more other sources, the method may include measuring emissions of a fourth energy, the emissions including emissions of a first type, to provide a further first type value. The measurement of emissions of a fourth energy may be performed instead of or in addition to the measurement of emissions of the first energy. The fourth energy is preferably an energy to which the one or more other sources do not contribute and/or do not cause the uranium to contribute. The further first type value obtained by the measurement of the fourth energy may be used instead of correcting the first type value. Preferably the interrelationship of the values for the further first type value, second type value and third type value then provide information on the dispersion of the radioactive material within the matrix. The further first type value, second type value and third type value may be used without having and/or referring to the first type value.

The fourth energy may be 110.43 keV and/or 111.31 keV and/or 114.34 keV and/or 114.57 keV. The emissions of the fourth energy may be measured by measuring a range of energies. Preferably the range of energies includes 110.43 keV and/or 111.31 keV and/or 114.34 keV and/or 114.57 keV. Where one of these fourth energy values is included in a range, the range may have limits of ±1 keV or ±0.5 keV or ±0.25 keV relative to this. Where the range of energies includes two or more of these fourth energy values, the lower limit of the range may be −1 keV or −0.5 keV or −0.25 keV relative to the lowest of the fourth energy values included in the range and/or the upper limit may be +1 keV or +0.5 keV or +0.25 keV relative to the highest of the fourth energy values included in the range Preferably the second energy is 89.953 keV and/or 89.9 keV and/or 84.2 keV. The emissions of the second energy may be measured by measuring a range of energies. Preferably the range of energies includes 89.953 keV and/or 89.9 keV and/or 84.2 keV. The range of energies may have a lower limit of 88.6 keV±0.5 keV. The range of energies may have a lower limit of 88.6 keV±0.25 keV. The range of energies may have a lower limit of 88.6 keV±0.1 keV. The range of energies may have an upper limit of 91.1 keV±0.5 keV. The range of energies may have an upper limit of 91.1±0.25 keV. The range of energies may have an upper limit of 91.1 keV±0.1 keV. The range of energies may have a lower limit of 83 keV±0.5 keV. The range of energies may have a lower limit of 83.2 keV±0.25 keV. The range of energies may have a lower limit of 84 keV±0.1 keV. The range of energies may have an upper limit of 85.5 keV±0.5 keV. The range of energies may have an upper limit of 85.2 keV±0.25 keV. The range of energies may have an upper limit of 84.4 keV±0.1 keV.

Preferably the emissions of the second type are thorium K X-ray emissions and/or emissions from thorium, more particularly thorium K X-ray emissions and/or emissions from $Th^{231}$. The emissions of the second type may be emissions caused by movement of electrons between shells and/or orbits and/or emissions, particularly caused by nucleus decay. The emissions of the second type may be thorium Kα emissions, particularly thorium $Kα_2$ emissions.

Preferably the emissions of the second type are emitted by a decay product of uranium, more particularly of $U^{235}$.

The second type value of the second energy may be expressed as a count rate or count or intensity or peak height or peak area.

The second type value may be corrected.

The expression may be corrected for attenuation by the matrix. The second type value may be corrected for detector efficiency and/or attenuation, particularly relative to different detector efficiencies and/or attenuation at other energies.

The second type value may be corrected to remove emissions from other sources and/or of other types. The second type value may be corrected to remove emissions from other elements than thorium. The second type value may be corrected to remove emissions other than thorium K X-ray emissions and/or $Th^{231}$ emissions, and in particular other than $Kα_2$ thorium emissions and/or $Th^{231}$ emissions. Particularly where the second type value includes an energy of 84.2 keV, the second type value may be corrected to remove emissions from lead. The second type value may be corrected to remove lead K X-ray emissions, particularly lead Kβ emissions and most particularly lead Kβ emissions of energy 84.6 keV.

The correction may be provided by establishing the amount in the matrix in respect of one or more other sources. The correction may involve the removal from the second type value of a correction proportional to the emissions within the second energy range which would arise from the established amount of that other source. The amount of the other source in the matrix may be established by measuring the emissions at at least one energy characteristic of that other source, and ideally at at least one energy characteristic of that other source only. The energy may be 87.4 keV, potentially ±0.1 keV. The value for the other source emissions may be expressed as a count rate or count or intensity or peak height or peak area. The value of the correction may be obtained by the known ratio of the other source emissions at the characteristic energy to the emissions from that other source which would therefore arise or would be generated by that other sources action on other material, particularly uranium, at an energy or energies falling within the first energy range. Such a correction may be provided in respect of one or more other sources, and in particular in respect of plutonium and/or caesium.

The second type value may be isolated from any contribution other than from thorium K X-ray emissions and/or emissions from thorium by a collimator. The detector for the second type of emissions may be provided within the collimator. The collimator may be a lead collimator. The collimator may be lined with copper or tin and preferably both. The copper and tin may be provided as layers, ideally approximately 1.5 mm thick. Preferably the copper is provided closest to the detector.

Preferably the third energy is 92.368 keV and/or 92.8 keV. The emissions of the third energy may be measured by measuring a range of energies. Preferably the range of energies includes 92.368 keV and/or 92.8 keV. The range of energies may further include one or more of 92.29 keV and or 93.35 keV and/or 95.868 keV and/or 94.66 keV. The range of energies may have a lower limit of 91.2 keV±0.5 keV. The range of energies may have a lower limit of 91.2 keV±0.25 keV. The range of energies may have a lower limit of 91.2 keV±0.1 keV. The range of energies may have an upper limit of 96.7 keV±0.5 keV. The range of energies may have an upper limit of 96.7±0.25 keV. The range of energies may have an upper limit of 96.7 keV±0.1 keV.

Preferably the emissions of the third type are emissions from thorium, more particularly from $Th^{234}$.

Preferably the emissions of the third type are emitted by a decay product of uranium, more particularly of $U^{238}$.

The method may include obtaining a measure of the third type, and preferably using that to provide the third type value. The method may include processing the measure of the third type to give a third type value.

The measure of the third type and/or the third type value may be expressed as a count rate or count or intensity or peak height or peak area.

The measure of the third type and/or the third type value may be corrected. The expression may be corrected for attenuation by the matrix. The third type value may be corrected for detector efficiency and/or attenuation, particularly relative to different detector efficiencies and/or attenuation at other energies.

The processing of the measure of the third type to give a third type value may include separation of the emissions of the third type from other emissions. In particular the processing may separate emissions arising from and/or indicative of $U^{238}$ from other emissions. In particular the processing may separate emissions arising from and/or indicative of $Th^{234}$ from other emissions. In particular the processing may remove emissions arising from and/or indicative of $U^{235}$ and/ or uranium K X-ray emissions and/or thorium K X-ray emissions and/or protactinium K X-ray emissions.

The processing may include determining the emissions attributable to $U^{238}$ according to the formula:—

$$_{U238}C^{ROI2} = {}_{TOTAL}C^{ROI2} - \left( {}_{U235}C^{ROI1} \times \frac{{}_{U235}B^{ROI2}}{{}_{U235}B^{ROI1}} \right) - \left( {}_{UK\alpha 1}C^{ROI3} \times \frac{{}_{UK\alpha 2}B^{ROI2}}{{}_{UK\alpha 1}B^{ROI3}} \right)$$

where $_{TOTAL}C^{ROI2}$=Net peak area counts for the third type value energy range;

$_{U235}C^{ROI1}$=Net peak area counts for the second type value energy range;

$_{UK\alpha 1}C^{ROI3}$=Net peak area counts for the first type value energy range;

$_{U235}B^{ROI2}$=Total U235 branching intensity in the third type value energy range;

$_{U235}B^{ROI1}$=Total U235 branching intensity in the second type energy range;

$_{UK\alpha 2}B^{ROI2}$=$UK_\alpha 2$ branching intensity in the third type energy range;

$_{UK\alpha 1}B^{ROI3}$=$UK_\alpha 1$ branching intensity in the second type energy range.

The interrelationship of the values for the first type value, second type value and third type value which provides information on the dispersion of the radioactive material within the matrix may be defined as $$_{UK\alpha 1}C^{ROI3} = a \times _{U235}C^{ROI1} + b \times _{U238}C^{ROI2}$$

The values of constants a and b may be determined through experimentation and/or calculation and/or modelling. In particular the value of the constants may be determined through a method according to the second aspect of the invention. The values of the constants a and b may be different for different enrichments and/or fissile contents of radioactive material.

The dispersion format of the radioactive material may be expressed in terms of the relationship:

$$F_{RATIO} = \frac{_{UK\alpha 1}C^{ROI3}}{(a \times _{U235}C^{ROI1} + b \times _{U238}C^{ROI2})}$$

An expression of the dispersion format of radioactive material within a matrix for one matrix may be compared with an expression of the dispersion format of radioactive material within a matrix for another matrix. A higher value for the expression may indicate a less dispersed form. A lower value for the expression may indicate a more dispersed form. The expression may be for an unknown radioactive material in matrix dispersion format and may be compared with a known radioactive material in matrix dispersion format. A relative indication of dispersion may thus be provided.

According to a second aspect of the invention we provide a method of establishing an interrelationship between the values for a first type value, a second type value and a third type value with isotopic composition of a radioactive material the interrelationship providing information on the dispersion of the radioactive material within the matrix, the method including:

defining a form for the interrelationship;

providing a plurality of different isotopic compositions of the radioactive material in a matrix and for each of the different isotopic compositions:

measuring emissions of a first energy, the emissions including emissions of a first type, to provide a first type value;

measuring emissions of a second energy, the emissions including emissions of a second type, to provide a second type value;

measuring emissions of a third energy, the emissions including emissions of a third type, to provide a measure of the third type, processing the measure of the third type to give a third type value;

adjusting the value of one or more factors in the interrelationship to fit the interrelationship to the observed values for the first type value, second type value and third type value with varying isotopic composition.

The method may further include using the values for the factors to determine the value of the interrelationship in respect of one or more unknown radioactive materials in a material where the radioactive material is of unknown isotopic composition. The relationship may be a linear equation. The factors may be a and b in a formula defined as:

$$_{UK\alpha 1}C^{ROI3} = a \times _{U235}C^{ROI1} + b \times _{U238}C^{ROI2}$$

The method may include the use of the interrelationship to provide information on the dispersion of the radioactive material within the matrix according to the form:

$$F_{RATIO} = \frac{_{UK\alpha 1}C^{ROI3}}{(a \times _{U235}C^{ROI1} + b \times _{U238}C^{ROI2})}$$

Different values for the factors may be established for different dispersion formats of the radioactive material.

The second aspect of the invention may include any of the features, options or possibilities set out elsewhere in this document.

According to a third aspect of the invention we provide a method for providing information on the dispersion of a radioactive material within a matrix, the method comprising:— measuring emissions of a first energy, the emissions including emissions of a first type, to provide a first type value;

measuring emissions of a second energy, the emissions including emissions of a second type, to provide a second type value;

the interrelationship of the values for the first type value and second type value providing information on the dispersion of the radioactive material within the matrix.

The interrelationship may be the ratio of the first type value to the second type value of vice versa.

In a first particularly preferred embodiment the invention may provide that the first energy is a range of energies. The range of energies may have a lower limit of 96.9 keV±0.5 keV. The range of energies may have a lower limit of 96.9 keV±0.25 keV. The range of energies may have a lower limit of 96.9 keV±0.1 keV. The range of energies may have a lower limit of 94 keV±0.5 keV. The range of energies may have a lower limit of 94 keV±0.25 keV. The range of energies may have a lower limit of 94 keV±0.1 keV. The range of energies may have an upper limit of 100.4 keV−0.5 keV+5 keV. The range of energies may have an upper limit of 100.4 keV±0.5 keV. The range of energies may have an upper limit of 100.4 keV±0.25 keV. the range of energies may have an upper limit of 100.4 keV±0.1 keV. Preferably the second energy is a range of energies. The range of energies may have a lower limit of 88.6 keV±0.5 keV. The range of energies may have a lower limit of 88.6 keV±0.25 keV. The range of energies may have a lower limit of 88.6 keV±0.1 keV. The range of energies may have an upper limit of 91.1 keV±0.5 keV. The range of energies may have an upper limit of 91.1±0.25 keV. The range of energies may have an upper limit of 91.1 keV±0.1 keV. The invention may provide that the amount of radioactive material is determined, preferably based upon the first type value and/or second type value. The amount of radioactive material may be corrected, preferably to account for self-shielding of emissions from it. The correction may be based upon an interrelationship of the values for the first type value and second type value and preferably a ratio between them.

In a second particularly preferred embodiment the invention may provide that the first type value is corrected to remove emissions, for instance of other types and/or from other sources. The first type value may be corrected to remove emissions from other elements than uranium. The first type value may be corrected to remove emissions other than uranium K X-ray emissions and in particular other than $K\alpha_1$ emissions. The first type value may be corrected to remove emissions from plutonium and/or stimulated by emissions from plutonium. The first value may be corrected to remove plutonium K X-ray emissions and/or to remove K X-rays arising from the decay of plutonium and/or to remove uranium K X-rays caused by stimulation other than by uranium, for instance by plutonium. The first type value may be corrected to remove emissions from and/or stimulated by emissions from caesium and in particular from $Cs^{137}$. The first value may be corrected to remove uranium K X-rays caused by stimulation by caesium. The first type value may be corrected to remove emissions other than those arising from the uranium and caused only by alpha and/or beta emissions from the uranium. The first type value may be corrected to remove emissions other than those arising from the uranium caused by alpha and/or beta emissions from another uranium atom. The first type value may be corrected to remove emissions other than those arising from self-stimulation of the uranium. The first type value may be corrected to remove K X-ray emissions, potentially $K\alpha$ emissions, ideally $K\alpha_1$ emissions, arising from stimulation of the uranium by alpha and/or beta and/or gamma emissions from other than uranium. The first type value may be corrected to remove K X-ray emissions, potentially $K\alpha$ emissions, ideally $K\alpha_1$ emissions, arising from stimulation of the uranium by alpha and/or beta and/or gamma emissions from plutonium and/or caesium. The correction may be provided by establishing the amount in the matrix in respect of one or more other sources. The correction may involve the removal from the first type value of a correction proportional to the emissions within the first energy range which would arise from the established amount of that other source. The amount of the other source in the matrix may be established by measuring the emissions at least one energy characteristic of that other source, and ideally at at least one energy characteristic of that other source only. The value for the other source emissions may be expressed as a count rate or count or intensity or peak height or peak area. The value of the correction may be obtained by the known ratio of the other source emissions at the characteristic energy to the emissions from that other source which would therefore arise or would be generated by that other sources action on other material, particularly uranium, at an energy or energies falling within the first energy range. Such a correction may be provided in respect of one or more other sources, and in particular in respect of plutonium and/or caesium. The first type value may be corrected for detector efficiency and/or attenuation, particularly relative to different detector efficiencies and/or attenuation at other energies.

In a third particularly preferred embodiment the invention may provide that the second type value is corrected to remove emissions from other sources and/or of other types. The second type value may be corrected to remove emissions from other elements than thorium. The second type value may be corrected to remove emissions other than thorium K X-ray emissions and/or $Th^{231}$ emissions, and in particular other than $K\alpha_2$ thorium emissions and/or $Th^{231}$ emissions. Particularly where the second type value includes energy of 84.2 keV, the second type value may be corrected to remove emissions from lead. The second type value may be corrected to remove lead K X-ray emissions, particularly lead $K\beta$ emissions and most particularly lead $K\beta$ emissions of energy 84.6 keV. The correction may be provided by establishing the amount in the matrix in respect of one or more other sources. The correction may involve the removal from the second type value of a correction proportional to the emissions within the second energy range which would arise from the established amount of that other source. The amount of the other source in the matrix may be established by measuring the emissions at at least one energy characteristic of that other source, and ideally at at least one energy characteristic of that other source only. The energy may be 87.4 keV, potentially ±0.1 keV. The value for the other source emissions may be expressed as a count rate or count or intensity or peak height or peak area. The value of the correction may be obtained by the known ratio of the other source emissions at the characteristic energy to the emissions from that other source which would therefore arise or would be generated by that other sources action on other material, particularly uranium, at an energy or energies falling within the first energy range. Such a correction may be provided in respect of one or more other sources, and in particular in respect of plutonium and/or caesium. The second type value may be isolated from any contribution other than from thorium K X-ray emissions and/or emissions from thorium by a collimator. The detector for the second type of emissions may be provided within the collimator. The collimator may be a lead collimator. The collimator may be lined with copper or tin and preferably both. The copper and tin may be provided as layers, ideally approximately 1.5 mm thick. Preferably the copper is provided closest to the detector. The second type value may be corrected for detector efficiency and/or attenuation, particularly relative to different detector efficiencies and/or attenuation at other energies.

In a fourth particularly preferred embodiment, the invention may provide that the second energy includes 84.2 keV. The emissions of the second energy may be measured by measuring a range of energies. The range of energies may include 84.2 keV. The range of energies may have a lower limit of 83 keV±0.5 keV. The range of energies may have a lower limit of 83.2 keV±0.25 keV. The range of energies may have a lower limit of 84 keV±0.1 keV. The range of energies may have an upper limit of 85.5 keV±0.5 keV. The range of energies may have an upper limit of 85.2 keV±0.25 keV. The range of energies may have an upper limit of 84.4 keV±0.1 keV. The range of energies may have an upper limit of 91.1 keV±0.5 keV. The range of energies may have an upper limit of 91.1±0.25 keV. The range of energies may have an upper limit of 91.1 keV±0.1 keV. The range of energies may have an upper limit of less than 94.6 keV, for instance an upper limit of 93.85 keV±0.5 keV. The range of energies may have an upper limit of 93.6±0.25 keV. The range of energies may have an upper limit of 93.5 keV±0.1 keV. The second type value may be corrected to remove emissions from lead. The second type value may be corrected to remove lead K X-ray emissions, particularly lead Kβ emissions and most particularly lead Kβ emissions of energy 84.6 keV.

In a fifth particularly preferred embodiment, the invention may provide that the second energy includes 143 keV. The emissions of the second energy may be measured by measuring a range of energies. The range of energies may include 143 keV. The range of energies may have a lower limit of 132 keV±2 keV. The range of energies may have a lower limit of 135 keV±2 keV. The range of energies may have a lower limit of 138 keV±1 keV. The range of energies may have an upper limit of 150 keV±5 keV. The range of energies may have an upper limit of 150 keV±2 keV. The range of energies may have an upper limit of 148 keV±1 keV.

The third aspect of the invention may include any of the features, options or possibilities set out elsewhere in this document.

According to a fourth aspect of the present invention we provide a method for providing information on the dispersion of a radioactive material containing uranium within a matrix, the method comprising:

measuring emissions of a first energy indicative of dispersion of the uranium, to provide a first type value;

measuring emissions of a second energy indicative of $U^{235}$, to provide a second type value;

measuring emissions of a third energy indicative of $U^{238}$ to provide a third type value;

the interrelationship of the values for the first type value, second type value and third type value providing information on the dispersion of the radioactive material within the matrix.

The fourth aspect of the invention may include any of the features, options or possibilities set out elsewhere in this application, including in the first and/or second and/or third aspects of the invention.

BRIEF DESCRIPTION OF THE DRAWINGS

Various embodiments of the invention will now be described, by way of example only, and with reference to the accompanying drawings in which:—

DETAILED DESCRIPTION OF THE PREFERRED EMBODIMENTS

A number of techniques exist for considering the emissions from a matrix containing radioactive materials and in particular uranium, with a view to determining the amount of radioactive material present. Such considerations are important in a number of situations, including the determination of the amount of radioactive material within a waste container.

Taking uranium as an example, an issue with existing approaches is the unknown nature of the uranium in terms of its level of dispersion. An amount X of uranium present in small particle form, with those small particles dispersed relative to one another in the matrix, but within the field of view of an instrument, will give a signal Y. However, if the same amount of uranium is present in small particle form, but with the particles in close proximity to one another then a reduced signal R is observed; R<Y. If the same amount of uranium is present as a single lump, then a further reduced signal S is observed; S<R<Y. This effect is caused by the ability of uranium to self-shield against emissions arising within itself.

Unless the nature of the dispersion of the uranium is established to some extent, then if a signal Q is detected for a matrix with unknown uranium levels, that signal must be assumed to arise from a single lump and the amount P indicated by such a signal must be scaled up, $P_{corrected}$ to reflect the risk that there has been self-shielding. However, if that signal Q had arisen in fact from a dispersed source then $P_{corrected}$ is an over estimate. Over estimates are undesirable for a number of reasons. For instance, the inventory of radioactive material a storage site can receive is limited and an over estimate unnecessarily uses it up.

An example of one such technique for considering the emissions from a matrix containing radioactive materials is differential peak attenuation, DPA.

The technique of the present invention is directed at providing information on the nature of dispersion of a radioactive material, particularly uranium, within a matrix.

Decay and Emissions Arising from Decay for Uranium

Figure 1A:
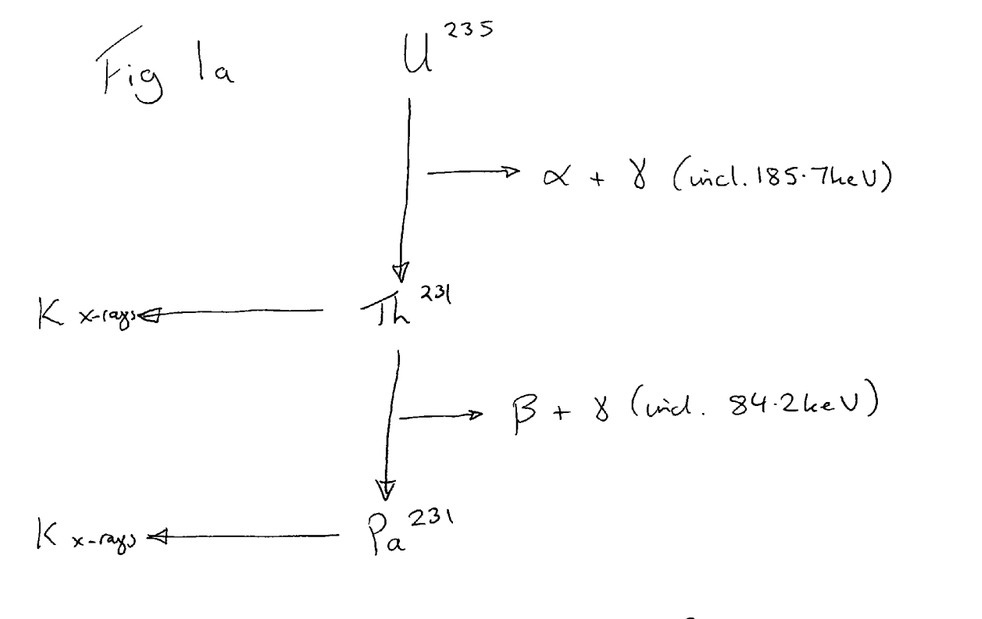
FIG. 1a is an illustration of the decay process and associated emissions relating to $U^{235}$.

FIG. 1a illustrates some of the decay and emission behaviour for uranium, and in particular for $U^{235}$. $U^{235}$ decays to give $Th^{231}$ through an alpha decay. Accompanying this decay are a number of characteristic energy gamma emissions, including 185.7 keV, which arises from the nucleus. Accompanying this decay also are a number of characteristic energy X-ray emissions, which arise from the electrons being excited from one shell to another and then returning. Excitation and return from the K shell is the most commonplace and gives rise to so called K X-ray emissions. In the case of the $U^{235}$ decay to give $Th^{231}$, the x-rays are characteristic of thorium and so are thorium K X-ray emissions. The intensity at these energies is quite low in respect of the emissions arising directly from the decay process.

The $Th^{231}$ in turn undergoes decay to $Pa^{231}$ through a beta decay. Accompanying this decay are a number of characteristic energy gamma emissions, including 84.2 keV, which arise from the nucleus. Accompanying this decay also are a number of characteristic energy X-ray emissions, which arise from the electrons being excited from one shell to another and then returning. Excitation and return from the K shell is the most commonplace again and gives rise to so called K X-ray emissions, which in this case are from protactinium and so are protactinium K X-ray emissions. Again, the intensity at these energies is quite low in respect of the emissions arising directly from the decay process.

Figure 1B:
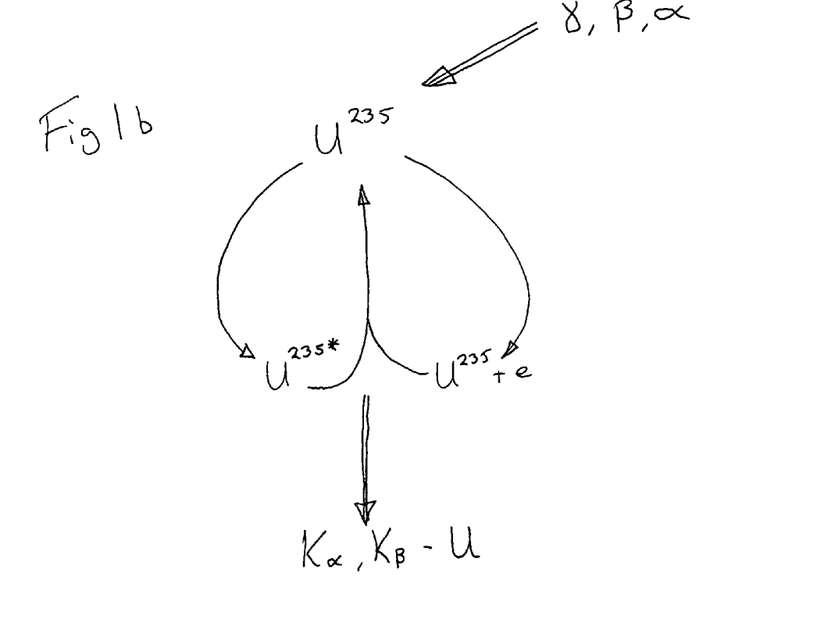
FIG. 1b is an illustration of the effect of external stimulation on $U^{235}$.

The above mentioned X-ray emissions are generated by the decay process itself. They can be considered as X-rays which are generated internally for that atom; internal conversion. As well as these emissions due to the decay of the isotopes present, other emissions may arise through stimulation of the isotopes materials present in the matrix. These fluorescence emissions are discussed in the next section, with further reference to FIG. 1$b$.

Fluorescence Emissions and $K\alpha$ and $K\beta$ Peak Intensities

When a uranium atom is stimulated by alpha and/or beta and/or gamma emissions of high enough energy from outside that atom, the electrons may be excited from their normal shell to another. Hence $U^{235}$ may be excited to $U^{235}*$ or further to $U^{235}+e$. In falling back from these excited states, the process causes x-rays of characteristic energies to be emitted. The process is illustrated with reference to $U^{235}$ in FIG. 1$b$. but these emissions occur from all the uranium forms present, including $U^{235}$, $U^{234}$ and $U^{238}$. The energies of these emissions arising from stimulation, fluorescence, correspond to the energies of the same emissions, from the same isotopes, caused directly by the decay process (discussed above). As such the intensities at these energies represent the combined contributions of the K X-ray emissions arising directly from the decay (internal) and the K X-ray emissions arising from stimulation (external).

Figure 2:
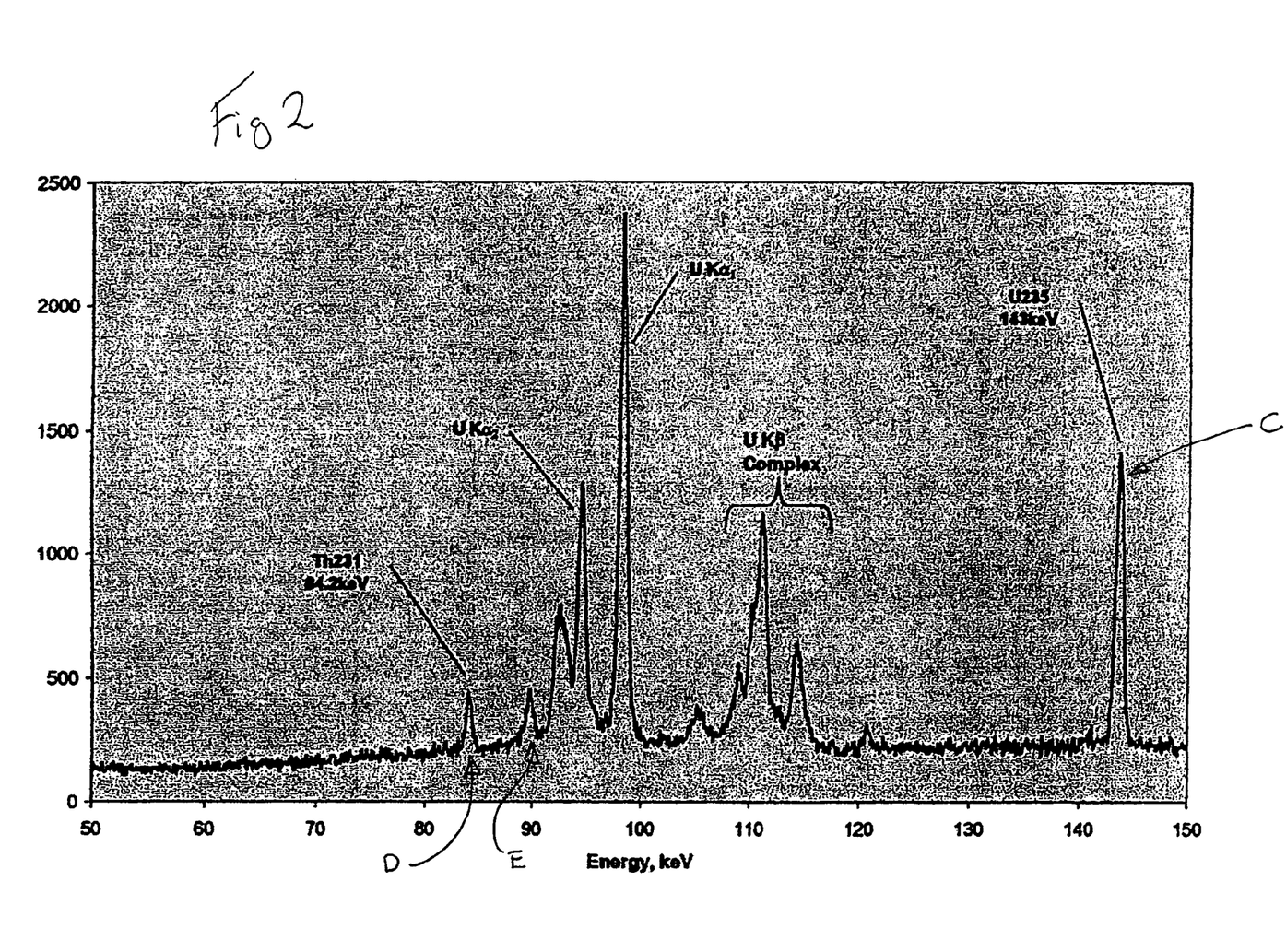
FIG. 2 is an illustration of the spectrum observed for the given energy range in respect of a matrix containing concentrated uranium.

A number of characteristic peaks for K X-ray emissions in the x-ray part of the spectrum from uranium are seen in FIG. 2. The peaks include a number of $K\alpha$ peaks, group A, and a number of $K\beta$ peaks, group B.

In general for uranium, two distinct $K\alpha$ peaks and three distinct $K\beta$ peaks are present. Their relative intensities are fixed and are detailed in Table 1.

TABLE 1

Figure 3:
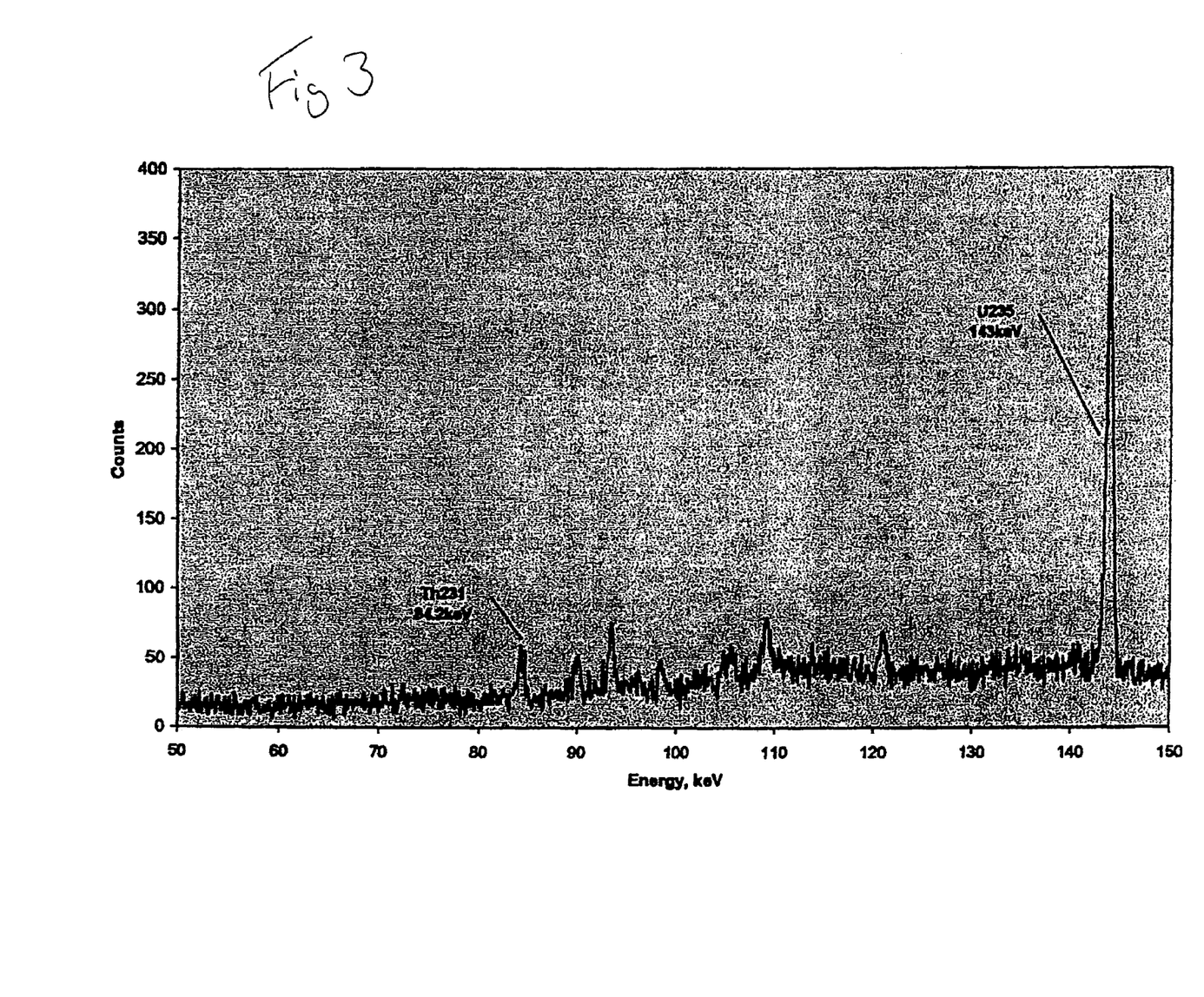
FIG. 3 is an illustration of the spectrum observed in respect of a matrix containing dispersed uranium.

| X-ray | Energy (keV) | Intensity (%) |
|---|---|---|
| U $K\alpha_2$ | 94.66 | 61.9 |
| U $K\alpha_1$ | 98.44 | 100.0 |
| U $K\beta_3$ | 110.43 | 11.6 |
| U $K\beta_1$ | 111.31 | 22.0 |
| U $K\beta_2$ | 114.34 and 114.57 | 12.3 |

Where the dispersion of the uranium within the matrix is great, then the level of stimulation is small because the main source of stimulation, self-stimulation, does not occur. The alpha emissions do not penetrate the matrix to a sufficient distance to reach other uranium. As a result, and as shown in the spectrum of FIG. 3, the intensity at the uranium K emission energies is really only contributed to by the K X-ray emissions arising directly from the decay process. This is a small signal, due the rate of the decay process and because only certain isotopes within the overall uranium decay and cause such emissions.

However, where the uranium is not dispersed, FIG. 2, then the major mechanism for such stimulation, self-stimulation due to the uranium's own alpha emission, occurs. The resulting intensity at characteristic energies reflects the same very minor contribution from K X-ray emissions arising directly from the decay process and the addition of the now very large contribution from the K X-ray emissions arising from stimulation (mainly due to alpha stimulation from $U^{234}$, with stimulation from $U^{238}$ more significant at lower enrichments). In the case of self-stimulation, the x-rays can be thought of as self-fluorescence x-rays. This mechanism for stimulation is increasingly important when the uranium is in concentrated form.

As noted above, other materials, notably $Th^{231}$, have K emission energies arising directly from the decay process. These materials are also subject to stimulation causing a further contribution to the intensities observed at those K emission energies. however, the amount of thorium present is extremely small compared with the amount of uranium and so the increase in the thorium K emission signal due to stimulation is small.

On this basis, it would be possible to consider the ratio of the emissions in a range from 89 keV to 93.9 keV to those in a range from 94.1 keV to 100 keV on the basis that those in the lower range were thorium K X-ray emissions and those in the upper range were uranium K X-ray emissions. The lower range could be extended to cover 84 keV to 93.9 keV, and so pick up the 84.2 keV peak. The ratio of the two, in terms of intensity/peak height and/or peak area, could then be used to provide an indication of the extent of dispersion. A higher thorium K emission to lower uranium K emission ratio would suggest a dispersed form; a lower thorium K emission to higher uranium K emission ratio would suggest a less dispersed form, such as a lump of uranium.

Full Consideration of the $K\alpha$ and $K\beta$ Peak Intensities

Whilst the above mentioned comparison of the thorium K emission and uranium K emission peak areas provides some information on the dispersion of the uranium, that information is quite limited as it does not take into account fully the position on the uranium K emission peaks, discussed in more detail in this section, and/or the position on the thorium K emission peaks, discussed in more detail in a later section.

The observed intensities for the uranium K emission peaks, such as those in FIG. 2, vary from case to case according to the rate of stimulation of the uranium and this in turn is related to three main factors:

1) the amount of uranium present influences the stimulation rate—the more uranium present, the greater the alpha emissions and the greater the stimulation;

2) the extent of dispersal of the uranium influences the stimulation rate—the proportion of emissions which subsequently stimulate the uranium and hence give rise to the uranium K emission x-rays is higher for uranium present in a closely grouped, concentrated, form than for uranium in a dispersed form;

3) the different isotopes within the uranium give rise to different emission rates for the species which in turn then cause the stimulation—a higher enrichment level uranium has higher alpha emission rates and hence a higher stimulation rate.

The third of these factors is not taken into account at all in the loose comparison of the thorium K emission and uranium K emission peaks with a view to considering the second of the factors. As such, the second factor is only considered in a rather relative and non-precise way; an indication of generally dispersed or generally concentrated uranium, but with no measure of the form.

Additionally, the loose comparison makes no account of other emissions which may appear to be part of one or more of the uranium K emission peaks (by virtue of being within one of the energy ranges referred to), but which in practice are not and so should not be considered in the determination.

The present invention, on the other hand addresses these issues and provides a more highly determined result.

Consideration of the Amount of Uranium Present—Known Isotopic Make Up

In some cases, the isotopic make up of the material being considered in a matrix may be known based on prior information, for instance about the waste stream it originates from, and so the amount of uranium and the extent of dispersal are left as the unknowns. In other cases, the isotopic make up is unknown and the operation of the technique in that context is described later.

When, as in this example, the isotopic make up is known, the establishment of the amount of uranium present can readily be made if another feature of the spectrum of FIG. 2 is considered. As discussed in more detail below, the predominant cause of the stimulation in most uranium containing matrices is α decays of $U^{234}$ and that isotope is in turn directly linked in proportion to $U^{235}$.

Within the spectrum, FIG. 2, there is a peak C at 143 keV which is characteristic of $U^{235}$. Potentially, therefore, the amount of $U^{235}$ could be considered based on this peak, the amount of $U^{234}$ considered from that and so, for various uranium dispersions, the expected stimulation rates and hence expected K emission peak intensities be determined. However, the $U^{235}$ peak observed at 143 keV is some way removed in energy from the uranium K emission peaks it is to be considered with. There is the potential, therefore, for the 143 keV and uranium K emission peaks to be attenuated to different and unknown relative extents. Because of this the technique of the present invention can be improved by considering one of a number of other peaks in FIG. 2.

One alternative peak, at a lower energy than the uranium K emission peaks, is the 84.2 keV peak, peak D. This is characteristic of $Th^{231}$. $Th^{231}$ is directly proportional to the $U^{235}$ present, as $Th^{231}$ has a relatively short half life (approx 25 hours) compared with the half life of $U^{235}$ of which it is a daughter product. Because this peak for $Th^{231}$ is considerably closer in energy to the uranium K emission peaks of interest than the $U^{235}$ peak, the difference in attenuation between them is minimal. The use of the 84.2 keV peak is potentially beneficial compared with say the 89.9 keV peak, peak E, as its intensity is not influenced by stimulation; the 89.9 keV peak is a potential combination of thorium gamma and thorium K X-ray emissions.

By using one of the above mentioned peaks and considering its intensity, a determination of the $U^{235}$ can be made. From that, the determination of the $U^{234}$ can be made, and given the knowledge of the isotopic make up, a determination of the $U^{238}$ can be made. As a result a determination of the total uranium is obtained. The determination can be expressed in terms of a total amount of uranium and/or can be expressed in terms of one or more of the isotopes.

However, the determination potentially needs correcting to give the actual amount of uranium as the effects of self shielding on the peaks considered needs to be established. Otherwise, the determinations are only an accurate reflection of the actual amount of uranium present if the uranium is present in small particles and is dispersed. If this is not the case, then there will be a degree of self-shielding and hence a correction is needed to get from the determination to the actual amount of uranium.

The extent of self-shielding is reflected in the extent of stimulation and hence in the self-fluorescence contribution to the uranium K emission peaks which are observed. Consideration of these uranium K emission peaks informs on the level of dispersion.

In a matrix with large uranium particle size and/or increased proximity of the particles to one another, this causes the spectrum to move towards and potentially beyond the FIG. 2 type spectrum. By considering the ratio of the intensity of the $U^{235}$ indicating energy to the intensity of a uranium K emission energy an indication as to the dispersion of the uranium can be obtained. If a lump is indicated then this can be used to provide a correction for the effects of self-shielding on the measure used to determine the amount of uranium and hence provide a correction to the determination of the actual amount of uranium present.

The specific correction applied is based on the ratio of the uranium $K\alpha_1$ emission peak to the $Th^{231}$ 84.2 keV or 89.9 keV peak. A higher ratio, 4:1 means more correction of the determination for uranium to increase that amount to give the actual amount. A lower ratio 1:2 means less or even no correction of the determination for uranium upward to the actual amount. The ratio of peak areas and/or peak heights can be considered.

In a matrix where the uranium is present as small widely dispersed particles the spectrum observed is similar to that in FIG. 3. Once again the $U^{235}$ characteristic peak at 143 keV is present as is the 84.2 keV peak for $Th^{231}$ and the 89.9 keV peak for $Th^{231}$. However, the extent of stimulation is not sufficient to produce large uranium K emission peaks. Instead even the uranium $K\alpha_1$ emission peak is quite low. Correction of the determination to give a more accurate actual amount is possible still in this case on the above mentioned basis. As the uranium becomes more widely dispersed and in very small particles, however, the uranium K emission peaks cease to be discernable and correction is neither needed or possible on this basis.

Figure 4:
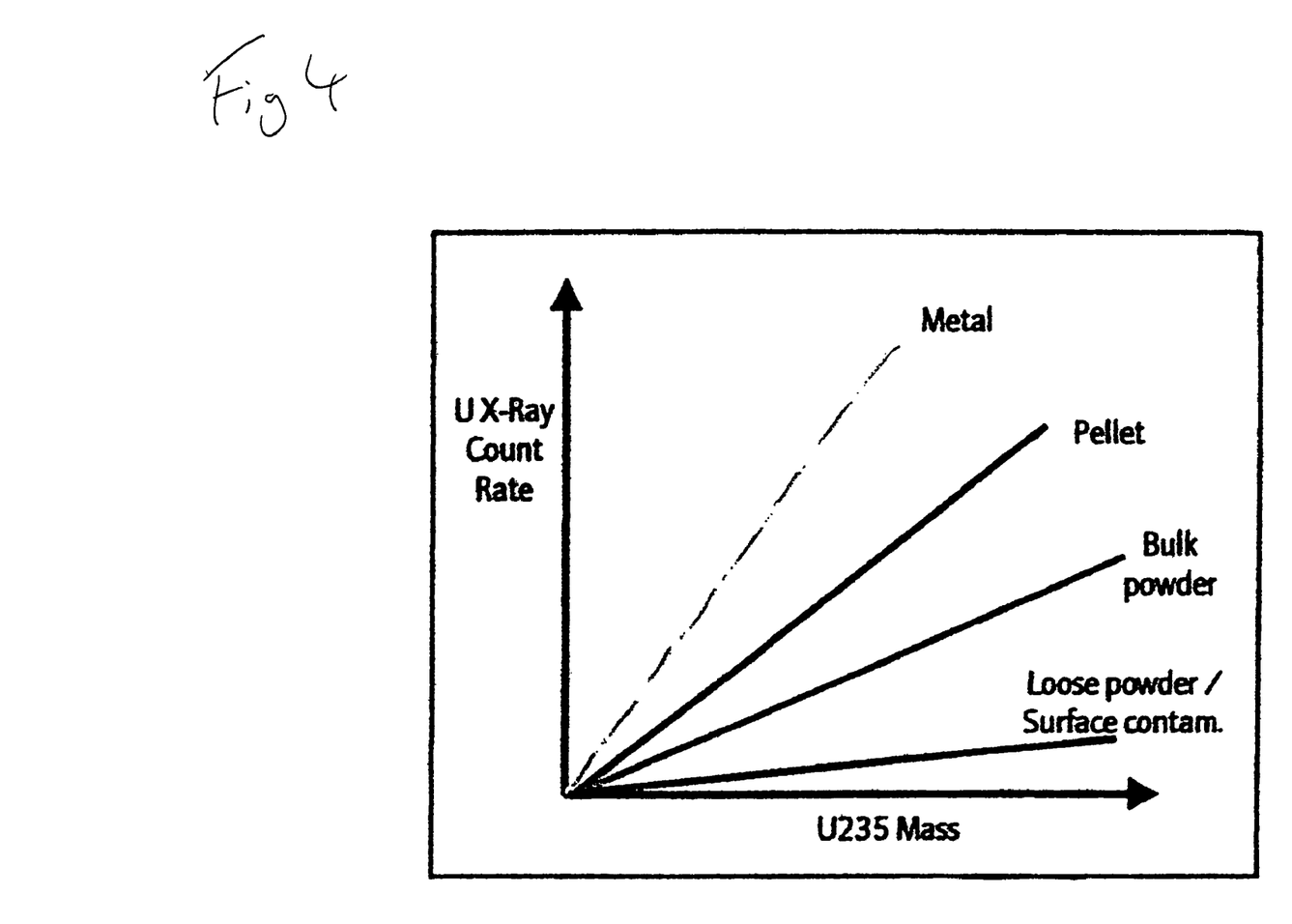
FIG. 4 is an illustration of the variation in uranium K peak rate with $U^{235}$ mass.

Information of this type is presented in FIG. 4, where uranium K peak rate against $U^{235}$ mass is plotted. Different ratios arise with different levels of dispersion or concentration. These vary through metal, pellet (compacted and sintered powder), bulk powder (partially compacted powder), loose powder/surface contamination to dissolved uranium.

Consideration of the Amount of Uranium Present—Unknown Isotopic Make Up

In many cases, the isotopic make up of the uranium will not be known and so consideration of this variable too is needed. This is because the different isotopes within the uranium contribute different amounts to the alpha emissions and hence to the stimulation. The specific activity for the different isotopes and the amount of each of those isotopes present both have an effect on the stimulation and hence uranium K emission peaks. The position with a series of example different materials, a series of different levels of enrichment, is set out in Table 2.

TABLE 2

| | Depleted | | | Natural | | | LEU | | |
|---|---|---|---|---|---|---|---|---|---|
| Isotope | Mass | Alpha Bq/gm U | Activity (%) | Mass | Alpha Bq/gm U | Activity (%) | Mass | Alpha Bq/gm U | Activity (%) |
| U234 | 0.002 | 4601 | 26.7 | 0.01 | 23007 | 64.0 | 0.021 | 48315 | 77.8 |
| U235 | 0.301 | 241 | 1.4 | 0.713 | 570 | 1.6 | 2.014 | 1611 | 2.6 |
| U238 | 99.7 | 12402 | 71.9 | 99.28 | 12350 | 34.4 | 97.93 | 12182 | 19.6 |

Because of the different contributions to the stimulation, the isotopic makeup of the uranium is a determining factor in the Kα peaks and Kβ peaks observed. In turn this means that where the isotopic make up of a sample being considered is not known, that must be determined to give an accurate result.

As the amount of $U^{234}$ in the uranium is proportional to the amount of $U^{235}$, information on the $U^{235}$ and $U^{238}$ content would provide the necessary information in this respect.

Figure 5:
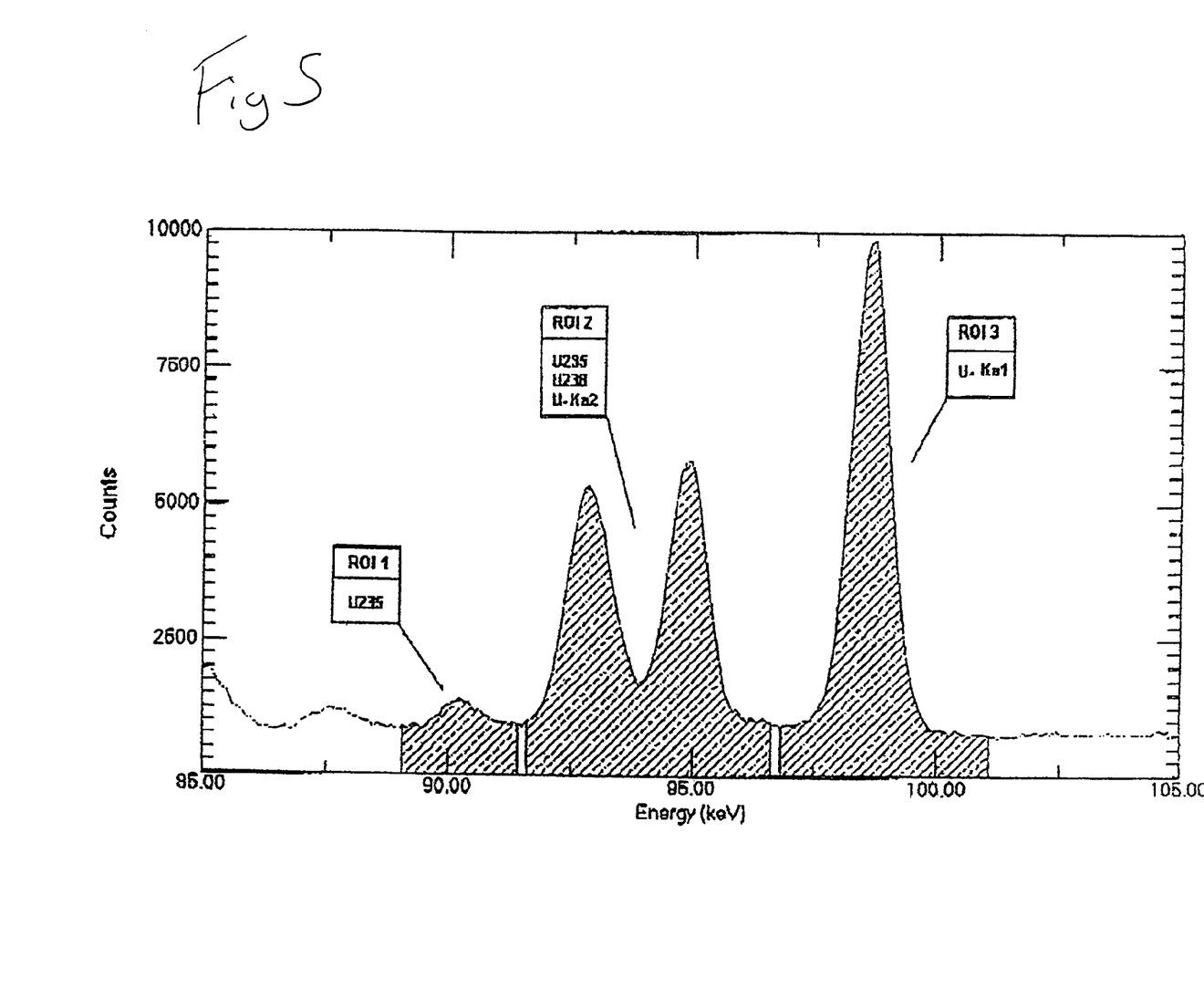
FIG. 5 is an illustration of the regions of interest in a spectrum considered when the isotopic make up of the uranium is unknown.

To obtain information sufficient to determine the proportion of $U^{235}$ and $U^{238}$, as well as measure the extent of dispersion of the uranium, the spectrum is considered in terms of a number of regions of interest, as shown in FIG. 5. The principle contributions to the count in each region of interest are noted below in Table 3.

TABLE 3

| Region of interest, ROI | Parent | Origin | Energy (keV) | Intensity (%) | Total Intensity (%) |
|---|---|---|---|---|---|
| 1 - 88.6 keV to 91.1 keV | $U^{235}$ | Th Kα$_2$ | 89.953 | 3.758 | 4.698 |
| | | Th$^{231}$ | 89.900 | 0.940 | |
| 2 - 91.2 keV to 96.7 keV | $U^{235}$ | Pa Kα$_2$ | 92.290 | 0.399 | 7.177 |
| | | Th Kα$_2$ | 93.350 | 6.131 | |
| | | Pa Kα$_2$ | 95.868 | 0.647 | |
| | $U^{238}$ | Th$^{234}$ | 92.368 | 2.721 | 5.410 |
| | | Th$^{234}$ | 92.800 | 2.689 | |
| | U-fluorescence | U Kα$_2$ | 94.660 | 61.900 | 61.900 |
| 3 - 96.9 keV to 100.4 keV | U-fluorescence | U Kα$_1$ | 98.440 | 100.00 | 100.00 |

The first region of interest, ROI 1, gives an indication of $U^{235}$ alone. The third region of interest, ROI 3, gives an indication of Kα$_1$ for uranium alone, and hence is an indication of dispersion. The second region of interest, ROI 2, includes contributions from $U^{235}$, $U^{238}$ and Kα$_2$ for uranium, and hence can be used to provide an indication of $U^{238}$. Due to the complex contributions to the second ROI, it must be processed further to extract the information on $U^{238}$.

The extraction takes the form:

$$_{U238}C^{ROI2} = _{TOTAL}C^{ROI2} - \left(_{U235}C^{ROI1} \times \frac{_{U235}B^{ROI2}}{_{U235}B^{ROI1}}\right) - \left(_{UK\alpha1}C^{ROI3} \times \frac{_{UK\alpha2}B^{ROI2}}{_{UK\alpha1}B^{ROI3}}\right)$$

where $_{TOTAL}C^{ROI2}$ = Net peak area counts for the third type value energy range;

$_{U235}C^{ROI1}$ = Net peak area counts for the second type value energy range;

$_{UK\alpha1}C^{ROI3}$ = Net peak area counts for the first type value energy range;

$_{U235}B^{ROI2}$ = Total U235 branching intensity in the third type value energy range;

$_{U235}B^{ROI1}$ = Total U235 branching intensity in the second type energy range;

$_{UK\alpha2}B^{ROI2}$ = UK$_\alpha$2 branching intensity in the third type energy range;

$_{UK\alpha1}B^{ROI3}$ = UK$_\alpha$1 branching intensity in the second type energy range.

and results in the indication of $U^{238}$ alone.

A series of known different enrichments of uranium in the same known form, for instance an uncompacted powder, are then measured to establish the uranium Kα$_1$ emission peak and other peaks with varying enrichment. The relationship is defined as:

$$_{UK\alpha1}C^{ROI3} = a \times _{U235}C^{ROI1} + b \times _{U238}C^{ROI2}$$

with the value of a and value of b being determined through fitting of the observed results to the relationship. In the case of the different enrichment bulk uranium powders, detailed in Table 4 below, this leads to a value of 11.4079 for a and a value of 1.2422 for b.

TABLE 4

| % $U^{235}$ | Form | ROI 1 count | ROI 2 count | ROI 3 count | Calculated counts $U^{238}$ | F$_{ratio}$ |
|---|---|---|---|---|---|---|
| 0.301 | U$_3$O$_8$ | 1249 ± 232 | 79916 ± 636 | 58818 ± 493 | 41600 | 0.89 |
| 0.419 | UO$_3$ | 652 ± 253 | 78255 ± 685 | 62930 ± 526 | 38305 | 1.14 |
| 0.713 | UO$_3$ | 1379 ± 249 | 82504 ± 673 | 64950 ± 519 | 40193 | 0.99 |
| 0.739 | U$_3$O$_8$ | 1521 ± 241 | 83558 ± 659 | 66946 ± 505 | 39795 | 1.00 |
| 0.985 | U$_3$O$_8$ | 1968 ± 247 | 88167 ± 667 | 71899 ± 517 | 40655 | 0.99 |
| 1.475 | U$_3$O$_8$ | 2932 ± 259 | 93648 ± 695 | 81021 ± 540 | 39017 | 0.99 |
| 2.014 | U$_3$O$_8$ | 3669 ± 266 | 98805 ± 716 | 90522 ± 555 | 37167 | 1.03 |

Once the value a and the value of b have been determined, they can be used to calculate the fluorescence ratio, F$_{ratio}$ for unknown samples, with the F$_{ratio}$ defined as follows:

$$F_{RATIO} = \frac{_{UK\alpha1}C^{ROI3}}{(a \times _{U235}C^{ROI1} + b \times _{U238}C^{ROI2})}$$

The application of this relationship, using the a and b values determined for bulk uranium powders, to the spectra resulting from a series of uranyl nitrate solutions produced the results in Table 5. The lower F$_{ratio}$ results obtained reflect the more dispersed nature of the uranium within the solutions.

TABLE 5

| %$U^{235}$ | Uranyl Nitrate Conc. g/l | ROI 1 | ROI 2 | ROI 3 | Calculated Counts $U^{238}$ | $F_{RATIO}$ |
|---|---|---|---|---|---|---|
| 0.405 | 24.96 | 724 ± 170 | 56579 ± 479 | 7718 ± 198 | 50696 | 0.11 |
| 0.405 | 29.94 | 1264 ± 180 | 67224 ± 506 | 9566 ± 218 | 59372 | 0.11 |
| 0.405 | 34.94 | 1470 ± 193 | 76526 ± 545 | 11619 ± 234 | 67088 | 0.12 |
| 0.405 | 40.06 | 1469 ± 204 | 86241 ± 573 | 13866 ± 250 | 75414 | 0.13 |
| 0.405 | 44.97 | 1420 ± 215 | 95635 ± 605 | 16405 ± 264 | 83311 | 0.14 |
| 0.405 | 49.89 | 928 ± 216 | 94278 ± 596 | 16174 ± 260 | 82849 | 0.14 |
| 0.405 | 55.06 | 1832 ± 231 | 112872 ± 656 | 20826 ± 288 | 97182 | 0.15 |
| 0.405 | 60.04 | 2095 ± 242 | 121921 ± 685 | 23528 ± 302 | 104157 | 0.15 |
| 0.405 | 49.89 | 928 ± 216 | 94278 ± 596 | 16174 ± 260 | 82849 | 0.14 |
| 0.704 | 49.89 | 3083 ± 234 | 107390 ± 656 | 21968 ± 298 | 80082 | 0.15 |
| 1.003 | 49.89 | 4249 ± 248 | 109833 ± 692 | 25063 ± 322 | 87828 | 0.16 |
| 1.498 | 49.89 | 5413 ± 266 | 113201 ± 721 | 29448 ± 346 | 86703 | 0.17 |
| 1.995 | 49.89 | 7686 ± 290 | 126160 ± 766 | 37371 ± 379 | 91286 | 0.19 |

The approach can usefully be deployed to assist existing measurement techniques, for instance DPA measurement techniques applied to containers with unknown wastes in them. Table 6 details the DPA results obtained for a number of packets of waste. Following an original DPA measurement these packets have been opened, re-packed and reconsidered using DPA with the revised results indicated. The fluorescence indication as to dispersion level, measured according to the present invention, is also indicated. As can be seen, there is good agreement between the fluorescence indication and the second DPA indication in almost all cases. The plutonium interference case is discussed further below.

TABLE 6

| DPA investigation | $F_{ratio}$ | Fluorescence indication |
|---|---|---|
| uranium lump | 1.05 | uranium lump |
| dilute uranium | 0.04 | dilute uranium |
| dilute uranium | 0.08 | dilute uranium |
| dilute uranium and plutonium interference | 0.81 | uranium lump |
| dilute uranium | 0.04 | dilute uranium |
| uranium lump | 0.93 | uranium lump |
| dilute uranium | 0.08 | dilute uranium |
| uranium lump | 0.54 | uranium lump |
| dilute uranium | 0.02 | dilute uranium |
| uranium lump | 1.19 | uranium lump |

Correction of the Kα and Kβ Peak Intensities

Further improvements on the basis technique detailed above are possible, particularly to improve the accuracy of the uranium Kα and Kβ peak intensities.

When uranium is the dominant material present, the uranium K X-ray emissions are contributed to by the uranium K X-ray emissions arising directly from the decay process, and when in a non-dispersed form, contributed to in the main by self-stimulation. The majority of the stimulation which causes the contribution to the uranium Kα emission peaks and uranium Kβ emission peaks comes from alpha emissions, with a smaller contribution from beta emissions. The gamma emissions from uranium are generally too low to cause stimulation. In such cases the observed uranium Kα and Kβ emission intensities relate directly to the uranium material only—decay and self stimulation. In other case, however, the observed uranium Kα and Kβ emission intensities include contributions arising from other α, β or γ sources which cause stimulation and give a need for correction.

One such situation arises where the material under consideration includes plutonium. Plutonium itself is a strong alpha emitter and as such emits species of sufficient energy and at a sufficient intensity to cause stimulation. The plutonium stimulates itself and gives rise to plutonium K X-ray emissions and gives stimulation of the uranium too and so further increases the uranium K X-ray emissions. K X-ray emissions also arise as a part of the decay of plutonium to uranium.

Figure 6:
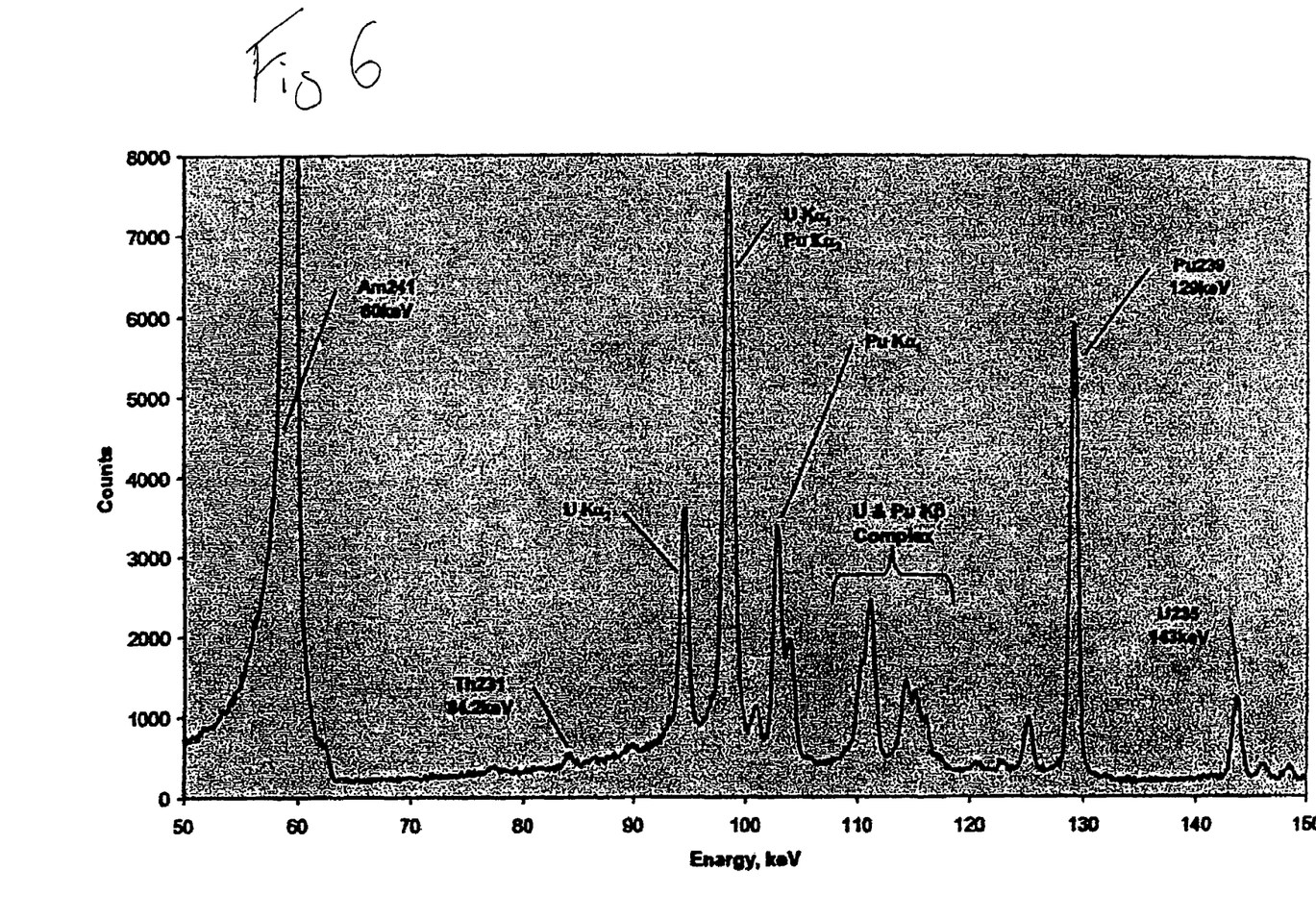
FIG. 6 is an illustration of the spectrum observed in respect of a matrix containing uranium and plutonium.

A typical spectrum for a uranium and plutonium containing matrix is shown in FIG. 6. Once again the Kα and Kβ peaks are present, but in this case the uranium $Kα_1$ emission peak is supplemented by the plutonium $Kα_2$ emission peak and by uranium $Kα_1$ emissions cause by the plutonium. This occurrence, rather than this peak being due solely to uranium, is apparent from other parts of the spectrum. Firstly, there is the characteristic 129 keV gamma peak of plutonium. Secondly, there is the plutonium $Kα_1$ emission peak which is spaced in energy from any uranium K emission peak. Because of the plutonium contribution to the uranium $Kα_1$ emission peak, the intensity for that peak needs to be corrected. The precise form of the correction will vary from situation to situation, dependant on what knowledge there is of the radioactive material in general—intimately mixed—materials present—and the plutonium in particular—isotopic make up. In general, however, correction for the additive effect of the plutonium $Kα_2$ peak on the uranium $Kα_1$ is possible by considering the plutonium $Kα_1$ peak which is proportional to the plutonium $Kα_2$ peak and/or by considering the amount of plutonium by virtue of characteristic gamma emissions. In general, the extra plutonium Kα emissions due to decay of plutonium can be addressed by using the plutonium gamma signature observed. In general, the extra stimulation of the uranium caused by the plutonium emissions and hence the extra uranium $Kα_1$ emissions can be addressed by using calibration samples to establish the extent of the effect with varying isotopic make up and/or lumpness and/or amount of plutonium. With an appropriate correction of this type performed a more accurate measure of uranium $Kα_1$ is provided and hence a more accurate measure of the dispersion is possible.

With reference to the results in Table 6, correction in this way for the plutonium K emission contribution reduces the value for the $F_{RATIO}$ to a level indicative of dilute uranium and hence again confirms the DPA result.

Alternatively the need for a deduction can be avoided by using one of the other uranium K emission peaks when the presence of plutonium is indicated. The uranium $Kα_2$ emission peak is preferred in this case as it is clear of other energies, both from uranium and plutonium, and is of significant intensity. Simpler correction can then be applied to account only for the extra uranium Kα emissions caused by the plutonium.

Another situation where correction might be desirable is where the matrix contains a noticeable amount of $Cs^{137}$. In this case, the $Cs^{137}$ is a strong gamma emitter and that too can cause extra stimulation of the uranium and hence extra uranium Kα emissions. The caesium K X-ray emissions are not at energies of concern. In many cases, the level of stimulation is not that great and so can be left uncorrected, on the basis that any error would lead to an overestimate of the amount of uranium, rather than a less desirable underestimate. Where correction is needed, then the amount of $Cs^{137}$ can be determined from characteristic gamma emission energies and a suitable deduction to the K peak(s) made.

The above mentioned principles can be extended to other situations in which alpha and/or beta and/or gamma emitters, above and beyond uranium, are present and so could contribute to one or more of the K peaks.

Correction of the Determination of the Uranium

Further improvements of the techniques detailed above are possible, in particular with respect to the position on the thorium K emission peak.

The determination of the uranium in the matrix (which is subsequently corrected to give the actual amount) is based upon the $Th^{231}$ 84.2 keV peak or $Th^{231}$ 89.9 keV peak or other $U^{235}$ indicating peak and assumes that all of that peak arises from the isotope described. In certain cases, however, other isotopes may be present within the matrix and/or information gathering system which contribute to the spectrum at or near the energy of interest. Lead when stimulated also produces fluorescent x-rays of energies similar to those being considered. Lead is commonly used for collimators for detectors and so could well be used in an information gathering system according to the present invention. One of the lead K emission peaks, Kβ, has an energy of 84.6 keV and so presents a difficulty in distinguishing it from the $Th^{231}$ 84.2 keV peak. If the intensity of that region is taken from the spectrum and not considered further, then the amount of $Th^{231}$, the amount of $U^{235}$ and the determination of uranium will be overestimated if determined from that information. If the determination of uranium is based on another part of the spectrum, but the correction to give the amount is based on the $Th^{231}$ peak then the correction will be an underestimate of the correction really needed.

To address this situation, if lead is revealed as being present, a peak at one or more energies in the spectrum informs the presence of lead, then a modification is applied. The modification can be in one or both of two forms.

Firstly, it is possible to use filtered collimators to remove the unwanted energy x-rays and leave only the energies which are desirable. A lead collimator, lined with 1.5 mm of copper and tin, with the copper closest to the detector, can be used for this purpose. The lining removes the lead K X-ray emissions and the copper and/or tin K X-ray emissions are not of an interfering energy.

Secondly, it is possible to make a determination of the amount of contribution to the spectrum near the 84.2 keV peak of $Th^{231}$ by considering the intensities at other energies for lead and by knowing the relationship between the intensity at that energy and the intensity at 84.6 keV. 87.4 keV represents a particularly useful energy for lead as it is discretely detectable and yet is close in energy (and so suffers the same attenuation) as the 84.6 keV x-rays.

The invention claimed is:

1. A method for providing information on the dispersion of a radioactive material within a matrix, the method comprising:

measuring emissions of a first energy, the emissions including emissions of a first type, to provide a first type value, the emissions of the first type being K x-ray emissions from uranium, the first energy being at least one energy selected from the group consisting of 94.66 keV, 98.44 keV, 110.43 keV, 111.31 keV, 114.34 keV and 114.57 keV;

measuring emissions of a second energy, the emissions including emissions of a second type, to provide a second type value;

measuring emissions of a third energy, the emissions including emissions of a third type, to provide a third type value;

the interrelationship of the values for the first type value, second type value and third type value providing information on the dispersion of the radioactive material within the matrix.

2. A method according to claim 1 in which the first energy is 98.44 keV.

3. A method according to claim 2 in which the emissions of the first energy are measured by measuring a range of energies.

4. A method according to claim 1 in which the emissions of the first energy are measured by measuring a range of energies and the range of energies has a lower limit of 96.9 keV±0.5 keV and/or the range of energies has an upper limit of 100.4 keV−0.5 keV +5 keV.

5. A method according to claim 1 in which the second energy is 89.953 keV and/or 89.9 keV and/or 84.2 keV.

6. A method according to claim 5 in which the emissions of the second energy are measured by measuring a range of energies.

7. A method according to claim 1 in which the emissions of the second energy are measured by measuring a range of energies and the range of energies has a lower limit of 88.6 keV±0.5 keV and/or the range of energies has an upper limit of 91.1 keV±0.5 keV.

8. A method according to claim 1 in which the emissions of the second energy are measured by measuring a range of energies and the range of energies has a lower limit of 83 keV±0.5 keV and/or the range of energies has an upper limit of 85.5 keV±0.5 keV or an upper limit of 84.4 keV±0.1 keV.

9. A method according to claim 1 in which the third energy is 92.368 keV and/or 92.8 keV.

10. A method according to claim 9 in which the emissions of the third energy are measured by measuring a range of energies.

11. A method according to claim 1 in which the emissions of the third energy are measured by measuring a range of energies and the range of energies has a lower limit of 91.2 keV±0.5 keV and/or the range of energies has an upper limit of 96.7 keV±0.5 keV.

12. A method according to claim 1 in which the method includes measuring one or more energies characteristic of other radioactive materials than uranium.

13. A method according to claim 12 in which, where the measurement indicates the presence of one or more other radioactive materials than uranium, the method includes measuring emissions of a fourth energy.

14. A method according to claim 13 in which the fourth energy is an energy to which the one or more other radioactive material do not contribute and/or do not cause the uranium to contribute.

15. A method according to claim 13 in which the fourth energy is 110.43 keV and/or 111.3 keV and/or 114.34 keV and/or 114.57 keV.

16. A method according to claim 13 in which the emissions of the fourth energy are measured by measuring a range of energies.

17. A method according to claim 13 in which the emissions of the fourth energy are measured by measuring a range of energies and the range of energies includes 110.43 keV and/or 111.31 keV and/or 114.34 keV and/or 114.57 keV.

18. A method for providing information on the dispersion of a radioactive material within a matrix, the method comprising:

measuring emissions of a first energy, the emissions including emissions of a first type, to provide a first type value, the emissions of the first energy being measured by measuring a range of energies, the range of energies having a lower limit of 96.9 keV±0.5 keV and/or the range of energies having an upper limit of 100.4 keV−0.5 keV+5 keV;

measuring emissions of a second energy, the emissions including emissions of a second type, to provide a second type value, the emissions of the second energy being measured by measuring a range of energies, the range of energies having a lower limit of 88.6 keV±0.5 keV and/or the range of energies having an upper limit of 91.1 keV±0.5 keV;

measuring emissions of a third energy, the emissions including emissions of a third type, to provide a third type value the emissions of the third energy are measured by measuring a range of energies, the range of energies having a lower limit of 91.2 keV±0.5 keV and/or the range of energies having an upper limit of 96.7 keV±0.5 keV;

the interrelationship of the values for the first type value, second type value and third type value providing information on the dispersion of the radioactive material within the matrix.

19. A method for providing information on the dispersion of a radioactive material within a matrix, the method comprising:

measuring emissions of a first energy, the emissions including emissions of a first type, to provide a first type value, the emissions of the first type being K x-ray emissions from uranium, the first energy being at least one energy selected from the group consisting of: 94.66 keV, 98.44 keV, 110.43 keV, 111.31 keV, 114.34 keV and 114.57 keV; measuring emissions of a second energy, the emissions including emissions of a second type, to provide a second type value, the second energy being at least one energy selected from the group consisting of 89.953 keV, 89.9 keV and 84.2 keV;

measuring emissions of a third energy, the emissions including emissions of a third type, to provide a third type value, the third energy being at least one energy selected from the group consisting of 89.953 keV, 89.9 keV, 84.2 keV and 143 keV;

the interrelationship of the values for the first type value, second type value and third type value providing information on the dispersion of the radioactive material within the matrix.

20. A method for providing information on the dispersion of a radioactive material within a matrix, the method comprising:

measuring emissions of a first energy, the emissions including emissions of a first type, to provide a first type value;

measuring emissions of a second energy, the emissions including emissions of a second type, to provide a second type value, the emissions of the second energy being measured by measuring a range of energies, the range of energies having a lower limit of 88.6 keV±0.5 keV and/or the range of energies having an upper limit of 91.1 keV±0.5 keV;

measuring emissions of a third energy, the emissions including emissions of a third type;

the interrelationship of the values for the first type value, second type value and third type value providing information on the dispersion of the radioactive material within the matrix.

\* \* \* \* \*